March 26, 1968

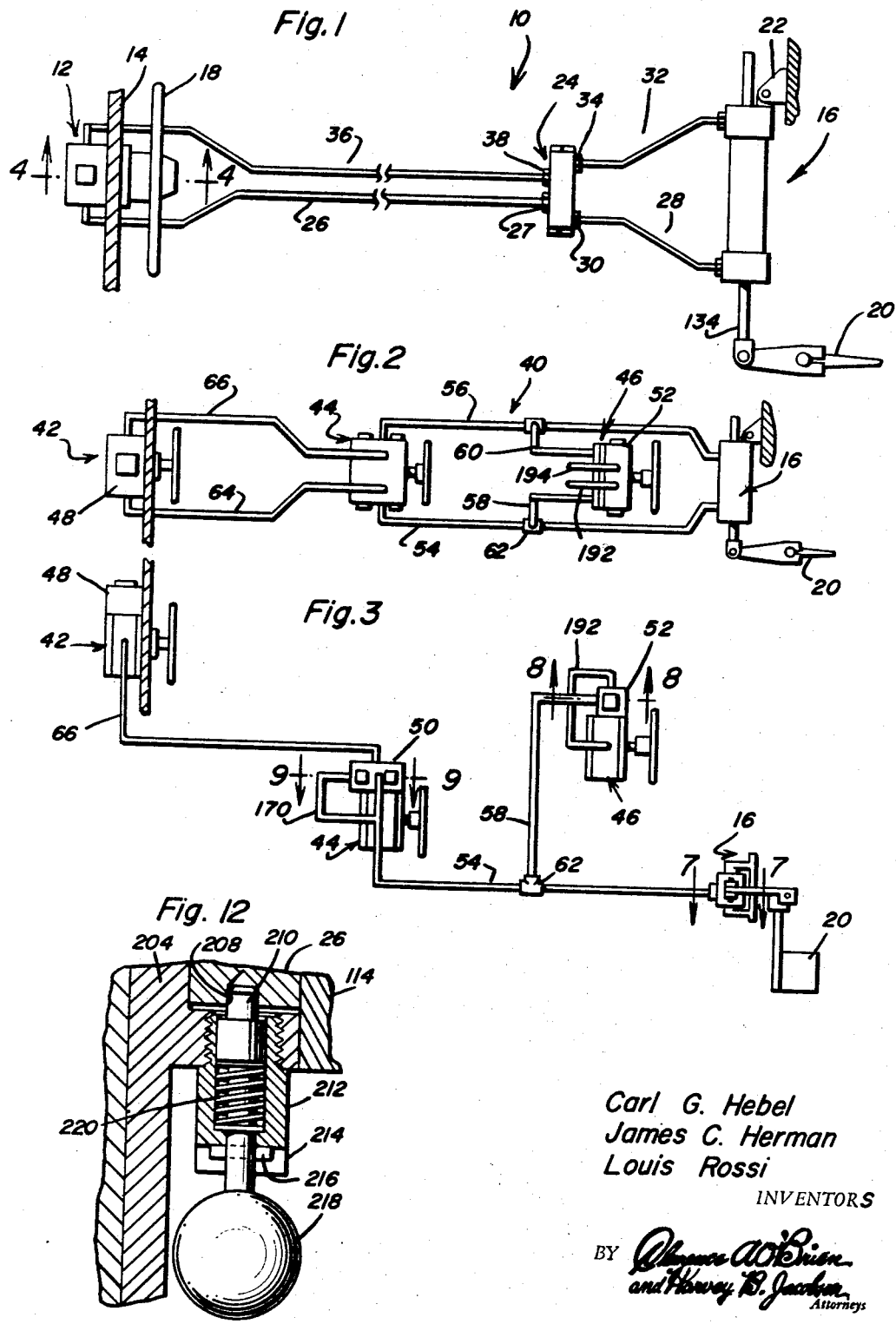

C. G. HEBEL ET AL 3,374,627

HYDRAULIC REMOTE STEERING CONTROL

Filed Nov. 3, 1965

Carl G. Hebel
James C. Herman
Louis Rossi
INVENTORS

BY *Clarence A. O'Brien*
*and Harvey B. Jacobson*
Attorneys

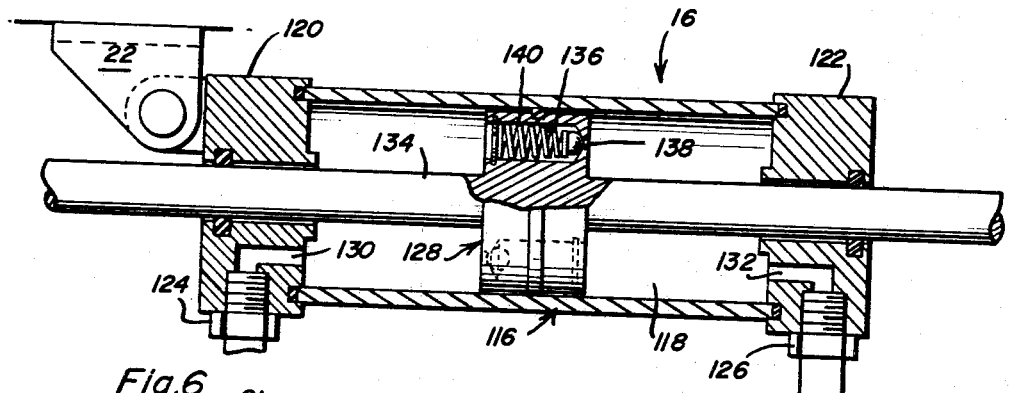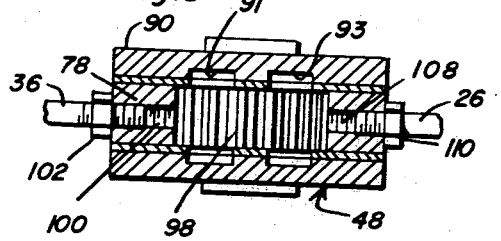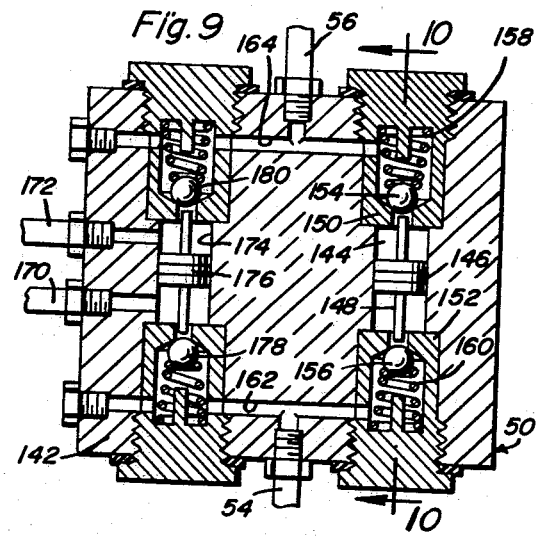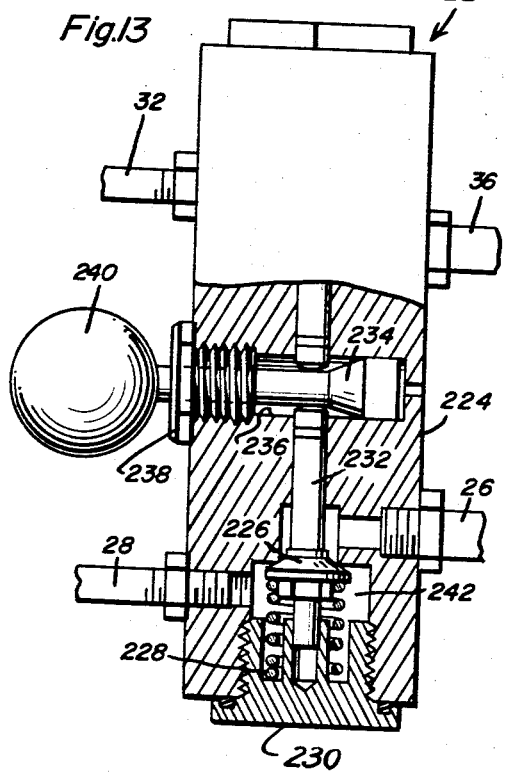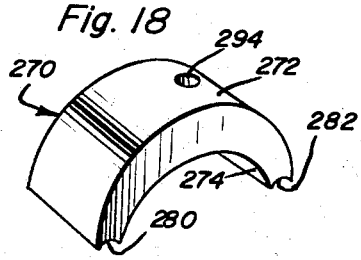

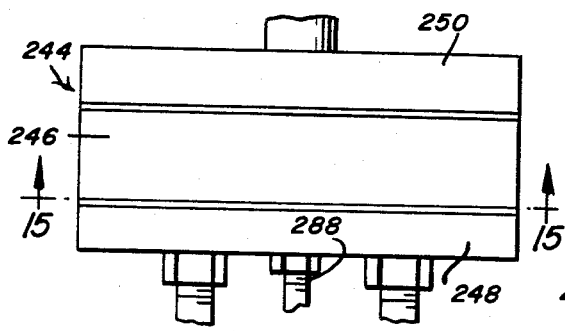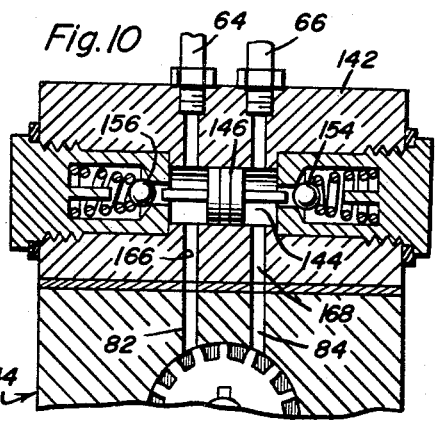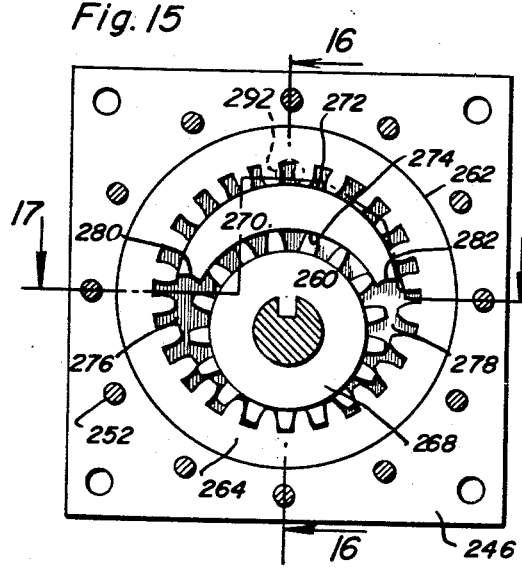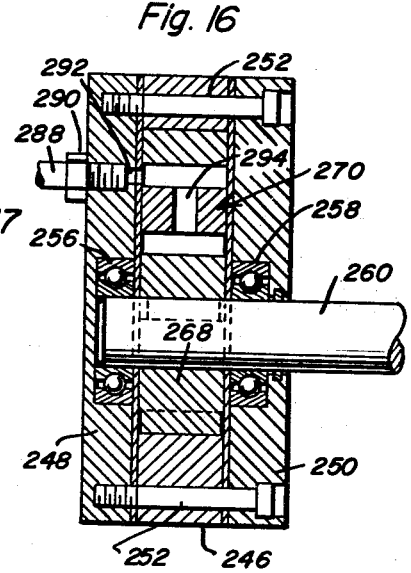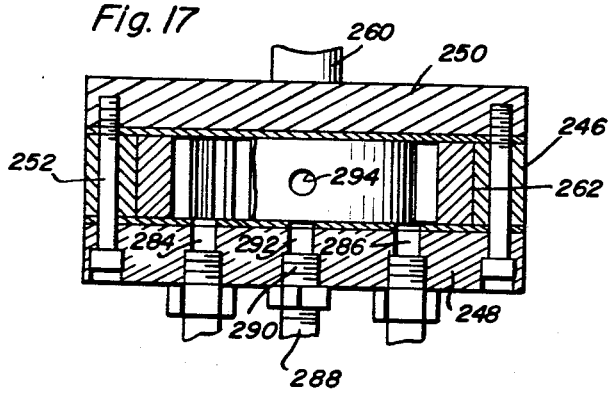
Carl G. Hebel
James C. Herman
Louis Rossi
INVENTORS

United States Patent Office 3,374,627
Patented Mar. 26, 1968

3,374,627
HYDRAULIC REMOTE STEERING CONTROL
Carl G. Hebel, 390 Jefferson Ave., Haworth, N.J. 07641;
James C. Herman, 146 Central Ave., Bogota, N.J.
07603; and Louis Rossi, 41 Washington Ave., Hillsdale,
N.J. 07642
Filed Nov. 3, 1965, Ser. No. 506,253
10 Claims. (Cl. 60—54.5)

ABSTRACT OF THE DISCLOSURE

A master pump unit is operated to displace liquid through a closed fluid circuit for remote control of fluid operated slave units. The pump unit is of the positive displacement type operative to charge the fluid circuit with liquid from a reservoir as well as to purge air from the circuit.

---

This invention relates to a fluid operated control system and more particularly to a remote control system involving a closed fluid circuit with facilities for charging the circuit with a liquid motivating medium and purging air or other gaseous fluids therefrom.

It is a primary object of the present invention, to provide a fluid control system having at least one actuated device or slave unit and a master control unit from which the slave unit may be manually positioned by displacement of a relatively incompressible motivating liquid through a closed fluid circuit, the system being provided with a reservoir containing such motivating liquid for both filling the fluid circuit with the liquid and purging air therefrom.

An additional object of the present invention is to provide a fluid remote control system having unidirectional flow control facilities for preventing drive of the master control unit by the load on the slave unit with means cooperating with the master control unit for filling the fluid circuit with liquid and purging air therefrom.

A further object of the present invention is to provide a fluid control system which requires no synchronization between the master and slave units.

In accordance with the foregoing objects, the fluid control system of the present invention involves a relatively simple arrangement of parts and procedure for filling the system with the motivating liquid without the use of any accumulators or other cooperating equipment. The system also is capable of being compensated for volumetric changes in the motivating liquid due to temperature variations for example. Further, the system may employ either one or a plurality of master control units from which the slave unit may be operated, flow control lock means being provided for isolating each of the master control units from each other and from the back pressure developed in the slave unit by the load imposed thereon.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of one form of fluid control system in accordance with the present invention involving a single master control unit.

FIGURE 2 is a top plan view of another form of fluid control system in accordance with the present invention involving a plurality of control units from which a single slave unit may be operated.

FIGURE 3 is a side elevational view of the system shown in FIGURE 2.

FIGURE 6 is a sectional view taken substantially through a plane indicated by section line 6—6 in FIGURE 5.

FIGURE 7 is an enlarged partial sectional view taken substantially through a plane indicated by section line 7—7 in FIGURE 3 showing a typical slave unit constructed in accordance with the present invention.

FIGURE 9 is an enlarged sectional view taken substantially through a plane indicated by section line 9—9 in FIGURE 3 showing another form of flow control lock mechanism also utilized in the same system.

FIGURE 10 is a partial sectional view taken substantially through a plane indicated by section line 10—10 in FIGURE 9.

FIGURE 12 is an enlarged, partial sectional view taken through a plane indicated by section line 12—12 in FIGURE 11.

FIGURE 13 is a side elevational view with parts broken away and shown in section of an alternative manually operated flow control lock mechanism.

FIGURE 14 is a top elevational view of another form of master control unit capable of being utilized in the system of the present invention.

FIGURE 15 is a sectional view taken substantially through a plane indicated by section line 15—15 in FIGURE 14.

FIGURE 16 is a sectional view taken substantially through a plane indicated by section line 16—16 in FIGURE 15.

FIGURE 17 is sectional view taken substantially through a plane indicated by section line 17—17 in FIGURE 15.

FIGURE 18 is a perspective view of one of the parts associated with the master control unit shown in FIGURES 14-17.

Figure 4:
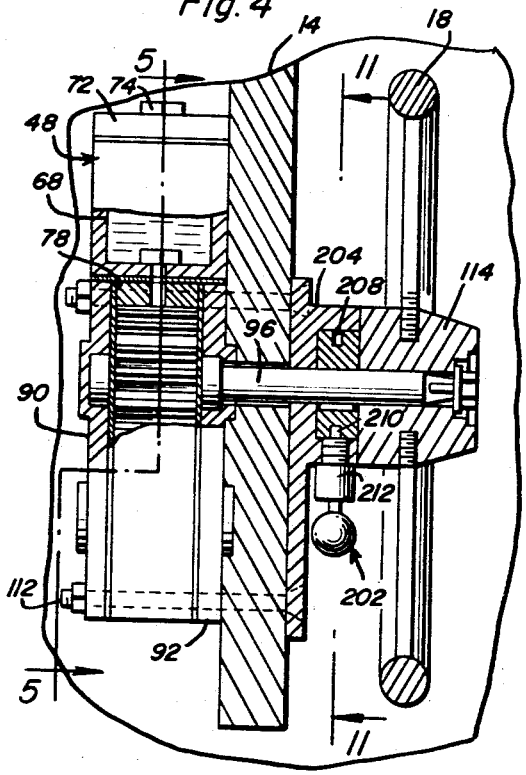
FIGURE 4 is an enlarged partial sectional view taken substantially through a plane indicated by section line 4—4 in FIGURE 1 showing a typical master control unit utilized in the system of the present invention.

Referring now to the drawings in detail, FIGURE 1 shows one form of remote, fluid control system generally referred to by reference numeral 10. The fluid control system includes a master control unit generally referred to by reference numeral 12 adapted to be suitably mounted at an operator's station on the panel 14 for example which is at a location remote from a slave unit generally referred to by reference numeral 16. By manipulating the operating handwheel 18 associated with the master unit 12, the operator may control movement of a driven element such as a steering control rudder 20 connected to the slave unit 16. The slave unit may therefore be pivotally mounted at the proper location by means of a pivot bracket 22 in order to control steering for example of a marine vessel. It will of course be appreciated, that the fluid control system 10 may be mounted in other installations for control of driven elements in general from one or more remote operator stations.

Also associated with the fluid control system 10, is a flow control lock mechanism generally referred to by reference numeral 24 by means of which the slave unit 16 will be hydraulically locked when the master control unit 12 is inoperative and also isolate the master control unit from any back pressure developed in the slave unit by virtue of the load imposed on the driven element 20.

The slave unit 16 is connected to the master control unit 12 by means of a closed fluid circuit through which a motivating liquid medium is circulated such as oil. The fluid circuit includes therefore, a supply conduit 26 connecting the discharge side of the control unit 12 to an inlet fitting 27 in the fluid lock mechanism 24. A conduit 28 connects an outlet fitting 30 of the fluid lock mechanism to one side of the slave unit 16, the other side thereof being connected by the conduit 32 to the fitting 34 of the fluid lock mechanism 24. A return conduit 36 connects the fitting 38 on the inlet side of the fluid lock mechanism 24 to the inlet side of the master control unit 12 in order to complete the fluid circuit. The functions of the conduits 26 and 36 are of course reversed when the rotational direction of the control unit 12 is reversed.

Referring now to FIGURES 2 and 3, another form of fluid control system is shown, generally denoted by reference numeral 40. Although the control system 40 includes a slave unit 16 identical to the slave unit associated with the system 10 shown in FIGURE 1, a plurality of control units 42, 44 and 46 similar in construction and operation to control unit 12 are provided so that the slave unit may be manually controlled from any one of a plurality of control stations. The first control unit 42 differs from the other control units in that it mounts or is connected to a reservoir 48 containing a relatively incompressible motivating liquid such as oil. The control unit 44 on the other hand is provided with a dual type fluid lock mechanism through which the control unit 44 is isolated from the slave unit and the control unit 42 in order to prevent movement of the control unit 44 by the slave unit or by the other control units. A single type fluid lock mechanism 52 on the other hand, is associated with the control unit 46 in order to isolate the control unit 46 from the fluid circuit when the control unit 46 is not being operated. The fluid circuit therefore includes a supply conduit 54 connecting the discharge side of the control unit 44 through its lock mechanism 50 to the slave unit while the inlet side of the control unit 44 is connected to the slave unit through its lock mechanism by means of the return conduit 56. Branch conduits 58 and 60 also connect the control unit 46 through its lock mechanism 52 to the supply and return conduits 54 and 56. The branch conduits 58 and 60 are connected to the conduits 54 and 56 through T-couplings 62. The control unit 42 is also connected to the supply and return conduits 54 and 56 through the fluid lock mechanism 50 by means of the conduits 64 and 66 respectively connected to the discharge and inlet sides of the control unit 42. It will therefore become apparent, that the liquid motivating medium is circulated through the slave unit from any one of the control units 42, 44 and 46. Inasmuch as the control units 44 and 46 have fluid lock mechanisms associated therewith, no additional fluid lock mechanism interconnects the supply and return lines to the slave unit as in the case of the system 10 illustrated in FIGURE 1. Further, the fluid lock mechanisms 50 and 52 include facilities which cooperate with the reservoir 48 associated with the first control unit 42 whereby the fluid circuit is filled with the motivating liquid while air is purged from the system.

Figure 5:
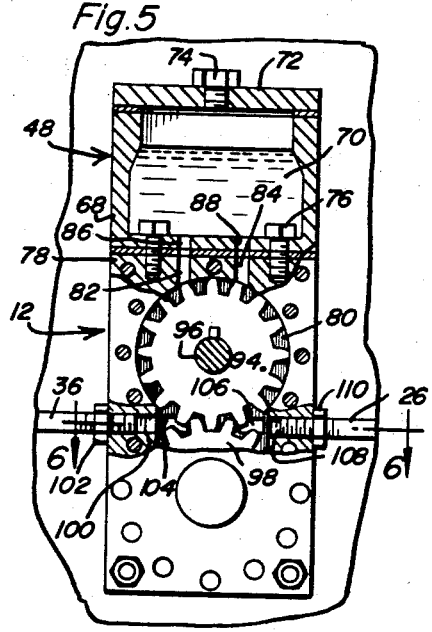
FIGURE 5 is a sectional view taken substantially through a plane indicated by section line 5—5 in FIGURE 4.

It will be apparent from the foregoing, that at least one of the control units associated with any system constructed in accordance with the present invention, will include a liquid containing reservoir such as the reservoir 48 associated with either the single control unit 12 of the system 10 or the first control unit 42 in the system 40. Referring therefore to FIGURES 4 and 5, it will be observed that the reservoir 48 includes a housing 68 enclosing a reservoir chamber containing the motivating liquid 70. The upper end of the housing is closed by a closure member 72 having an atmospheric vent fitting 74 so that the liquid 70 will be confined to the reservoir chamber under atmospheric pressure. The reservoir housing 68 in the illustrated embodiment, is secured by the fasteners 76 to the housing section 78 associated with the control unit. It will also be observed, that the reservoir housing is positioned above the control unit so that the motivating liquid 70 may flow under the influence of gravity into the upper pressure chamber 80 within the housing section 78 by means of the vertical filling passages 82 and 84 aligned with the ports 86 and 88 formed in the bottom wall of the reservoir housing 68.

The housing section 78 associated with the control unit is clamped between the end plates 90 and 92 to form a housing assembly enclosing the upper pressure chamber 80 of a positive displacement pump within which a fluid displacing gear member 94 is rotatably mounted by means of the drive shaft 96 journaled in the end plates 90 and 92. A lower pressure chamber is also formed between the end plates within the housing section 78 and rotatably mounts therewithin a second fluid displacing gear member 98 which meshes with the gear member 94. Also formed in the housing section 78 is an inlet port 100 to which the return conduit 36 is connected by means of the fitting 102 so as to establish fluid communication with the inlet space 104 on one side of the meshing teeth of the fluid displacing gear members 94 and 98. A discharge pressure space 106 is also formed between the fluid displacing gear teeth on the other side of the meshing teeth in fluid communication with discharge port 108 to which the supply conduit 26 is connected by means of the fitting 110. Also formed in the end plates 90 and 92 are spaced cavities 91 and 93 as more clearly seen in FIGURE 6, respectively communicating with the inlet and discharge spaces 104 and 106. The cavities 91 and 93 relieve any buildup of pressure between the gear teeth during operation of the control unit and thereby eliminate operational roughness.

When the fluid circuit with which the control unit is associated is completely filled with the motivating liquid, fluid may be circulated therethrough in response to rotation of the fluid displacing gear 94 by the handwheel 18 connected to the drive shaft 96. The drive shaft therefore extends through an opening formed in the control panel 14 to which the housing assembly of the control unit is secured by fasteners 112, so that the drive shaft may be secured to the handwheel by its hub portion 114. The teeth of the fluid displacing gear members 94 and 98 will therefore displace fluid from the inlet space 104 to the discharge space 106 when rotated in the directions indicated by the arrows in FIGURE 5. Ordinarily, there will be no flow of liquid 70 from the reservoir 48 into the pressure chamber 80 as long as the fluid circuit is completely filled with liquid. However, when the fluid circuit is filled with air, the air or a mixture of air and liquid will be displaced from the fluid circuit by the above atmospheric pressure developed in the discharge space 106 causing flow of air into the inlet space 104 within which suction pressure is also developed to augment such flow in response to rotation of the fluid displacing gears. Air or a mixture of air and liquid will therefore be displaced from the inlet space 104 by means of the gear teeth through the peripherally outer portion of the pressure chamber 80 so that the air will be sequentially brought into communication with the passages 82 and 84. The air will then either bubble up through the passage 82 or 84 into the reservoir chamber or be displaced upwardly thereinto by the downwardly discending liquid 70 which is substantially heavier or denser than the air. Accordingly, the air brought into communication with the passages 82 and 84 will be replaced by liquid so that continued rotation of the fluid displacing gear 94 will transfer the air replacing liquid to the discharge space 106. The replacement of the air by liquid will occur whether the air is at a pressure below or above atmosphere because the liquid is denser than the air and descends through the passages 82 and 84 under the influence of gravity. Therefore, during the filling of the fluid circuit with the motivating liquid, the fluid supplied to the inlet space 104 will be a mixture of air and liquid. Most of the air within the mixture will then be displaced by the teeth of the gear member 94 upwardly into the chamber 80 while most of the liquid portion will be displaced downwardly by the gear member 98 toward the discharge space 106. The fluid transferred to the discharge space 106 by the gear member 94 will be depleted of its air component and replaced by liquid as aforementioned. Thus, continued rotation of the fluid displacing gear members will progressively purge the air from the fluid circuit and fill it with the motivating liquid.

Referring now to FIGURE 7, it will be observed that the slave unit includes a cylinder assembly 116 enclosing a fluid chamber 118 between the cylinder head portions 120 and 122 to which fluid supply and return fittings 124 and 126 are connected. The fittings establish fluid communication between the fluid conduits and the fluid chamber on either side of a piston assembly 128 through passages 130 and 132 formed in the cylinder head portions. An elongated piston shaft 134 is connected to the piston assembly 128 and extends axially from opposite ends thereof through the cylinder head portions so that one end of the piston shaft may be connected to the driven element. Formed within the piston assembly 128, are a pair of valve bores 136 within which one-way check valves 138 are mounted. The check valves 138 are held closed against normal operating and back pressure by the springs 140 so that normally there is no flow of fluid from one side of the piston assembly to the other. Thus, rotation of the positive displacement gear elements associated with the master control unit in one or the other direction will produce axial displacement of the piston assembly in one or the other corresponding direction in order to correspondingly position the driven element connected to the piston shaft 134. However, during the filling procedure aforementioned, after the piston assembly 128 is displaced to a limit position abutting one of the cylinder head portions 120 or 122, continued rotation of the positive displacement gear elements within the control unit will increase the pressure of the liquid and air mixture supplied to the slave unit on one side of the piston assembly to open one of the check valves. The mixture of air and liquid will then return to the control unit so that the air may be purged from the circuit as aforementioned. The provision of one or two check valves in the piston assembly is therefore essential in connection with the air purging and liquid filling procedure associated with the present invention.

As hereinbefore indicated, the systems constructed in accordance with the present invention may provide facilities for isolating each of the control units from the closed fluid circuit when the control unit is inoperative. The control unit 44 associated with the system 40 shown in FIGURES 2 and 3 is therefore provided with a dual type of flow control lock mechanism. Referring therefore to FIGURES 9 and 10 in particular it will be observed that the lock mechanism 50 includes a valve block assembly 142 secured to the top of the control unit 44. Formed within the valve block assembly, is a valve chamber 144 within which an actuating piston 146 is reciprocably mounted. A valve opening piston rod 148 extends axially from opposite sides of the piston 146 through valve passages formed within valve seats 150 and 152 on which spring-pressed valve elements 154 and 156 are seated. When opened, the valve elements permit the establishment of fluid communication between the end spaces 158 and 160 and the valve chamber 144 on opposite sides of the piston 146. Fluid communication is established by the connecting passage 162 between the space 160 and the supply conduit 54 while the connecting passage 164 establishes a fluid connection between the end space 158 and the return conduit 56. Also, fluid communication is established between the valve chamber 144 on opposite sides of the piston 146 with the passages 82 and 84 associated with the control unit 44 by means of the passages 166 and 168 in the valve block 142 as shown in FIGURE 10. Fluid communication is thereby established through the valve chamber 144 between the conduits 64 and 66 and the liquid filling passages 82 and 84 associated with the control unit 44. Thus, during the liquid filling and air purging operation, liquid under pressure may be supplied from the control unit 42 to the control unit 44 through one of the conduits 64 and 66 causing the valve opening piston 146 to be displaced in one direction opening a corresponding valve element 154 or 156. Therefore, at the same time that liquid is supplied to the control unit 44, it will also be supplied through the open valve element to one of the conduits 54 or 56 in order to fill the remainder of the fluid circuit. When the fluid circuit is filled with liquid, the passages 166 and 168 are ineffective so that the valve elements 154 and 156 are only operative to establish fluid communication between the control unit 42 and the conduits 54 and 56 of the fluid circuit. On the other hand, when the control unit 44 is being utilized to operate the slave unit the motivating liquid is pressurized in one of the conduits 170 and 172 which interconnect the discharge and inlet ports of the control unit 44 with the valve chamber 174 on opposite sides of the valve actuating piston 176 as shown in FIGURE 9. Accordingly, the piston 176 is operative to open one of the spring-pressed valve elements 178 and 180 in order to establish fluid communication with either the conduit 54 or the conduit 56 through the connecting passage 162 or 164. If the control unit 44 is inoperative, so that no pressure is developed in either of the conduits 170 and 172, both of the valve elements 178 and 180 will be closed in order to prevent the back pressure developed within the conduit 54 or 56 from inducing flow into the control unit 44.

Figure 8:
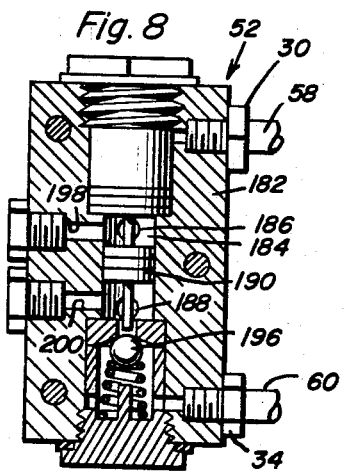
FIGURE 8 is an enlarged sectional view taken substantially through a plane indicated by section line 8—8 in FIGURE 3 showing one form of flow controlling lock mechanism utilized in one type of system.

The single type of flow control lock mechanism 52 is utilized in connection with the control unit 46 to accommodate both filling of the control unit with liquid and to prevent back pressure from entering it. As shown in FIGURE 8, the lock mechanism 52 includes a valve block 182 secured to the top of the control unit 46. A single valve chamber 184 is however formed in the valve block which communicates with the control unit through its liquid filling passages by means of the passages 186 and 188 on either side of the valve actuating piston 190. Fluid under pressure supplied to the valve chamber on one side of the piston 190 from the discharge port of the control unit 46 through either conduit 192 or 194 as shown in FIGURE 2 will therefore open one of the valve elements 196 as shown in FIGURE 8 in order to establish fluid communication with one of the branch conduits 58 or 60 so as to supply pressurized liquid to the slave unit.

Figure 11:
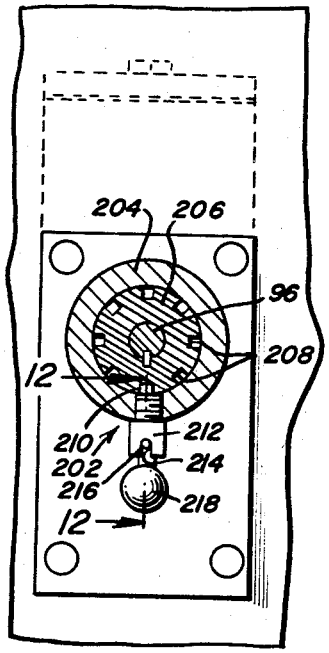
FIGURE 11 is an enlarged partial sectional view taken substantially through a plane indicated by section line 11—11 in FIGURE 4 showing a mechanical lock mechanism for one form of master control unit.

With continued reference to FIGURE 8, it will be observed that the valve block 182 is provided with passages 198 and 200 so that the lock mechanism may be used in a different installation such as the lock mechanism 24 illustrated in FIGURE 1. In this installation, the bypass passages 186 and 188 which communicate with the filling passages 82 and 84 of the control unit are eliminated. Instead, the valve chamber 184 is connected by fittings 27 and 38 to the conduits 26 and 36 while the conduits 58 and 60 are replaced by the conduits 28 and 32. Accordingly, the valve chamber on one side of the valve actuating piston will be pressurized by operation of the master control unit in order to establish fluid communication with one of the conduits 28 and 32 for actuating the slave unit in one direction. When the control unit is inoperative, the valve elements 196 will be closed so as to prevent any back pressure from communicating through the conduits 26 and 36 with the control unit. The lock mechanism 24 is therefore associated only with the slave unit where a single control unit is utilized for control thereof. In such case, the control unit may also be provided with a mechanical lock generally referred to by reference numeral 202 as shown in FIGURES 4, 11 and 12. The mechanical lock mechanism 202 is operative to positively hold the handwheel in one of a plurality of angular positions until released and toward this end, a bracket member 204 is secured to the control panel between the control panel and the hub 114 of the handwheel so as to form an annular space about the drive shaft 96 within which a lock wheel 206 is enclosed. The lock wheel is splined to the drive shaft and is provided with a plurality of circumferentially spaced notches 208 within which the end of a locking plunger 210 is received. The locking plunger is slidably mounted by a fitting 212 threadedly secured to the bracket 204 and having a guide slot 214 receiving a guide pin 216 which projects from the locking plunger. The radially outer end of the locking plunger is provided with a knob 218 so that the locking plunger may be withdrawn from the notch 208 in order to release the handwheel for operation. The locking plunger is normally biased to its locked position by a spring element 220 as shown in FIGURE 11. When the plunger is withdrawn against the bias of the spring 220 by the knob 218 so that the guide pin 216 clears the fitting 212, the knob may be rotated so as to bring the guide pin 216 out of alignment with the guide slot 214 and thereby hold the locking plunger in its retracted position.

In lieu of a fluid operated type of locking mechanism such as the locking mechanism 52 or 24 hereinbefore described, a manually operated type may be utilized as shown in FIGURE 13. The manually operated lock mechanism as shown in FIGURE 13, is generally denoted by reference numeral 222 and includes a valve block 224 to which the conduits 26, 36, 28 and 32 are connected as described in connection with the lock mechanism 24 of FIGURE 1. A pair of conical valve elements 226 are slidably mounted within the valve block and biased to a closed position by the spring elements 228 seated by the threaded assembly nuts 230 at the opposite longitudinal ends of the valve block 224. Actuating plungers 232 extend from the valve elements toward each other for engagement with an elongated cam operating member 234. The cam operating member 234 is slidably mounted within a central, transverse bore 236 and extends through a threaded fitting 238 externally of the valve block. Connected to the outer end of the cam operating member 234 externally of the valve block is a manual control knob 240. It will therefore be apparent, that upon axial displacement of the cam operating member 234 outwardly by means of the control knob 240, the actuating plunger portions 232 of the valve elements will displace the valve elements 226 against the bias of the springs 228 in order to establish fluid communication between the conduits 26 and 28 and 36 and 32 respectively through the valve chambers 242. Thus, the slave unit may be hydraulically locked in position and the master control unit isolated therefrom under manual control.

Referring now to FIGURES 14 through 18, an alternative form of master control unit is shown, generally denoted by reference numeral 244. The control unit 244 includes a housing section 246 which is clamped between a pair of end plates 248 and 250 held together in assembled relation by the fasteners 252. The end plates mount spaced bearings 256 and 258 for journaling a drive shaft 260 which extends from the housing assembly through the end plate 250. A single annular cavity 262 is formed within the housing section 246 for rotatably mounting an internal gear member 264 the teeth of which mesh with an external fluid displacing gear member 268. The gear member 268 is splined to the drive shaft 260 and is rotatably mounted about an axis offset with respect to the rotational axis of the internal gear member 264. Accordingly, a space is formed within the cavity between the teeth of the gear members 264 and 268, this space being occupied by a spacer block 270 having a radially outer arcuate surface 272 on which the internal teeth of the gear member 264 ride and a radially inner arcuate surface 274 on which the external teeth of the external gear 268 ride. Pressure spaces 276 and 278 are formed between the meshing gear teeth at the opposite arcuate end portions 280 and 282 of the spacer block 270, the pressure spaces being respectively in fluid communication with ports 284 and 286, one of which is the discharge port and the other the inlet port depending upon the direction of rotation of the fluid displacing gear member 268.

It will be apparent, that when the ports 284 and 286 of the control unit 244 are connected to the conduits of a closed fluid circuit, rotation of the fluid displacing gear by a hand-wheel (not shown) connected to the drive shaft 260 will displace the motivating liquid as hereinbefore described. Also associated with the control unit 244, will be a fluid reservoir which may be attached thereto or spaced therefrom as long as it is placed above the control unit 244 so that motivating liquid may flow under the influence of gravity into the control unit through conduit 288 for liquid filling and air purging purposes. The conduit 288 is therefore connected by the fitting 290 in the end plate 248 with a passage 292 that extends axially into the space between the teeth of internal gear 164. A radial passage 294 in the spacer block 270 connects the spaces between the teeth of both gears 264 and 268. Fluid communication is thereby established between the reservoir containing the motivating liquid and fluid displaced by the gear teeth along both the radially outer and radially inner surfaces 272 and 274 of the spacer block. The advantage of the control unit 244 over the control units such as illustrated in FIGURES 4 and 5 is that for the same fluid displacement, the control unit 244 may be made much smaller in size. The control unit 244 may therefore occupy the same relationship to the systems hereinbefore described as occupied by the control units 12, 42, 44 or 46.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new as is as follows:

1. A remote control system comprising a reservoir containing a motivating liquid under atmospheric pressure, at least one positive displacement device having a pressure discharge port and a suction pressure inlet port, passage means including two passages between said ports connecting said reservoir to the positive displacement device for gravity flow of said motivating liquid into the positive displacement device, closed fluid circuit means connected to the discharge and inlet ports for operatively circulating said motivating liquid therebetween in response to operation of the positive displacement device, and operating means connected to the positive displacement device for said operation thereof, said positive displacement device including a pump chamber, and rotary fluid displacing means mounted in said chamber for sequentially displacing air from the inlet port through one of the passages and displacing said liquid entering the chamber from the other of the passages to the discharge port.

2. The combination of claim 1 wherein said closed fluid circuit means includes an actuated device having a fluid chamber and a piston displaceable therein between limits, valve means mounted by said piston for circulating a mixture of said liquid and air through the fluid chamber in response to displacement of the piston to one of said limits by a pressurized mixture of said liquid and air from the positive displacement device.

3. The combination of claim 2 including flow control means operatively connecting the positive displacement device to the actuated device for preventing circulation through the positive displacement device when inoperative.

4. A remote control system comprising a reservoir containing a motivating liquid under atmospheric pressure, at least one positive displacement device having a pressure discharge port and a suction pressure inlet port, passage means including two passages between said ports connecting said reservoir to the positive displacement device for gravity flow of said motivating liquid into the positive displacement device, closed fluid circuit means connected to the discharge and inlet ports for operatively circulating said motivating liquid therebetween in response to operation of the positive displacement device, and operating means connected to the positive displacement device for said operation thereof, said closed fluid circuit means including an actuated mechanism having a fluid chamber and a piston displaceable therein between limits, valve means mounted by said piston for circulating a mixture of said liquid and air through the fluid circuit in response to displacement of the piston to one of said limits.

5. The combination of claim 4 including flow control means operatively connecting the positive displacement device to the actuated mechanism for preventing circulation through the positive displacement device when inoperative.

6. A remote control system comprising a reservoir containing a motivating liquid under atmospheric pressure, a plurality of positive displacement devices, at least two passages connecting said reservoir to one of said devices for gravity flow of said motivating liquid into the positive displacement device, closed fluid circuit means connected to said positive displacement devices for operatively circulating the motivating liquid in response to operation of any one of said positive displacement devices, operating means connected to each of said devices, each of said devices including a discharge port, an inlet port, a pump chamber in fluid communication with said ports and fluid displacing means rotatably mounted in the chamber of said one of the devices for sequentially displacing air from the inlet port through one of the passages and displacing said liquid entering the chamber from the other of the passages to the discharge port.

7. The combination of claim 6 including flow control means connected to each of said devices except said one device for preventing circulation therethrough when inoperative, and bypass means in said flow control means for conducting liquid from said one device into the other devices when purging air from the fluid circuit means.

8. The combination of claim 7 wherein said closed fluid circuit means includes an actuated device having a fluid chamber and a piston displaceable therein between limits, valve means mounted by said piston for circulating a mixture of said liquid and air through the fluid chamber in response to displacement of the piston to one of said limits by a pressurized mixture of said liquid and air from the positive displacement device.

9. A remote control system comprising a reservoir containing a motivating liquid under atmospheric pressure, at least one positive displacement device having a pump chamber, rotary fluid displacing means, a pressure discharge port and a suction pressure inlet port, passage means including two passages between said ports connecting said reservoir to the positive displacement device for gravity flow of said motivating liquid into the positive displacement device, closed fluid circuit means connected to the discharge and inlet ports for operatively circulating said motivating liquid therebetween in response to operation of the positive displacement device, and operating means connected to the positive displacement device for said operation thereof, said rotary fluid displacing means including a pair of meshing gears rotatably mounted in said chamber, said inlet and discharge ports being connected to said chamber on opposite sides of said meshing gears, said passages being connected to the chamber between the ports spaced in circumferential relation to at least one of said meshing gears.

10. The combination of claim 9 including spaced fluid pressure relief cavities formed in the pump chamber in communication with said inlet and discharge ports.

References Cited

UNITED STATES PATENTS

| | | | |
|---|---|---|---|
| 2,627,868 | 2/1953 | Runnels | 60—54.5 X |
| 2,882,686 | 4/1959 | Griffith | 60—54.5 |
| 2,997,849 | 8/1961 | Shimanckas | 60—54.5 |
| 3,204,413 | 9/1965 | Pace | 60—54.5 |

MARTIN P. SCHWADRON, *Primary Examiner.*

ROBERT R. BUNEVICH, *Examiner.*